United States Patent [19]

Wagner et al.

[11] Patent Number: 6,039,982
[45] Date of Patent: *Mar. 21, 2000

[54] USE OF A DEAMINATING OXIDASE IN BAKING

[75] Inventors: Peter Wagner, Holte, Denmark; Joan Qi Si, Laufen, Switzerland

[73] Assignee: Novo Nordisk A/S, Bagsvaerd, Denmark

[ * ] Notice: This patent is subject to a terminal disclaimer.

[21] Appl. No.: 09/065,398

[22] Filed: Apr. 23, 1998

Related U.S. Application Data

[63] Continuation of application No. PCT/DK96/00500, Dec. 2, 1996.

[30] Foreign Application Priority Data

Dec. 8, 1995 [DK] Denmark ................................ 1402/95
Dec. 11, 1995 [DK] Denmark ................................ 1405/95

[51] Int. Cl.$^7$ ...................................................... A21D 2/00
[52] U.S. Cl. ................................ 426/18; 426/19; 426/20; 426/52; 426/549
[58] Field of Search ................................ 426/18, 23, 19, 426/20, 22, 49, 52, 549

[56] References Cited

U.S. PATENT DOCUMENTS 5,856,451  1/1999  Olsen et al. ............................ 530/402

FOREIGN PATENT DOCUMENTS 0 136 159   4/1985   European Pat. Off. .
0 321 811   6/1989   European Pat. Off. .
0 338 452  10/1989   European Pat. Off. .
0 435 606   7/1991   European Pat. Off. .
WO 94/25574 11/1994  WIPO .

OTHER PUBLICATIONS

Hachitsuka et al., Patent Abstracts of Japan, abstracting JP 02–245145, Sep. 28, 1990.

Tur et al., Federation of European Biochemical Societies, vol. 238, No. 1, pp. 74–76 (1988).

*Primary Examiner*—Leslie Wong
*Attorney, Agent, or Firm*—Steve T. Zelson; Valeta Gregg

[57] ABSTRACT

A method for preparing a dough or a baked product produced from the dough, including adding to dough or dough ingredients an L-amino acid oxidase or a benzylamine oxidase in an amount effective to improve gluten strength, stickiness, or rheological properties of dough, or specific volume of the baked product. Further includes are bread- or dough-improving compositions including an L-amino acid oxidase or a benzylamine oxidase.

17 Claims, 2 Drawing Sheets

USE OF A DEAMINATING OXIDASE IN BAKING

CROSS-REFERENCE TO RELATED APPLICATIONS

This application is a continuation application of PCT/DK96/00500 filed Dec. 2, 1996 and claims priority under 35 U.S.C. 119 of Danish application serial nos. 1402/95 and 1405/95 filed Dec. 8, 1995 and Dec. 11, 1995, respectively.

FIELD OF THE INVENTION

The present invention relates to a bread-improving or dough-improving composition comprising an enzyme as well as to a method of preparing a dough and/or a baked product by use of the composition.

BACKGROUND OF THE INVENTION

In the bread-making process it is known to add bread-improvising and/or dough-improving additives to the bread dough, the action of which, inter alia, results in improved texture, volume, flavour and freshness of the bread as well as improved machinability of the dough.

In recent years a number of enzymes have been used as dough and/or bread improving agents, in particular enzymes which act on components present in large amounts in the dough. Examples of such enzymes are found within the groups of amylases, proteases, glucose oxidases and cellulases, including pentosanases.

EP 321 811 and EP 338 452 disclose the use, in baking, of glucose oxidase in combination with other enzymes (sulfhydryl oxidase, hemicellulase, cellulase). Glucose oxidase catalyzes the oxidation of β-D-glucose with oxygen whereby D-glucono-1,5-lactone and hydrogen peroxide is formed.

Deaminating enzymes, i.e. enzymes which are capable of removing amine groups from some amine containing substrates, are widely occurring in nature and have been found to be produced by many types of organisms including animals, plants and microorganisms. The enzymes catalyze a reaction between the amine containing substrate, water and oxygen resulting in the deamination of the substrate and the concomitant formation of hydrogen peroxide. The deaminating enzymes may contain copper or FAD. The hitherto most extensively described groups of deaminating enzymes are the amine oxidases and the amino acid oxidases.

The use, in baking, of a deaminating oxidase has never been suggested before.

It is the object of the present invention to improve the properties of dough and/or baked products by the use of an deaminating oxidase enzyme.

BRIEF DISCLOSURE OF THE INVENTION

Accordingly, in a first aspect the present invention relates to a bread-improving and/or a dough-improving composition comprising a deaminating oxidase enzyme.

In the present context the terms "bread-improving composition" and "dough-improving composition" are intended to indicate compositions which, in addition to the enzyme component, may comprise other substances conventionally used in baking to improve the properties of dough and/or baked products. Examples of such components are given below. The term "deaminating oxidase" is intended to indicate any enzyme which is capable of catalyzing an oxidative removal of amine groups from an amine containing substrate with the concomitant formation of hydrogen peroxide.

Without being limited to any theory it is presently contemplated that when an effective amount of a deaminating oxidase enzyme is added to dough intended for use in the preparation of baked products, it may exert an oxidizing effect on dough constituents and thereby serve to, e.g., improve the strength of gluten structures in the dough and/or baked products and thereby the strength, the rheological and the handling properties of the dough.

More specifically, the oxidizing effect is believed to be obtained when the enzyme catalyzes the deamination of amine containing compounds present in the flour or other dough constituents with the concomitant formation of hydrogen peroxide. Flour contains a high number of primary amine groups.

In the present context the term "improved properties" is intended to indicate any property which may be improved by the action of an effective amount of a deaminating oxidase enzyme. In addition to or as a consequence of the gluten strengthening effect mentioned above, the use of a deaminating oxidase has been found to result in an increased volume of the baked product (vide the Examples hereinafter) and an improved shock stability thereof. Also, it is contemplated that an improved crumb structure and softness of the baked product may be obtained by use of an effective amount of a deaminating oxidase, as well as an increased strength, stability and reduced stickiness and thereby improved machinability of the dough. The effect on the dough may be particularly good when a poor quality flour is used. The improved machinability is of particular importance in connection with dough which is to be processed industrially. It will be understood that the term "effective amount" as used in relation to the dosage of the deaminating enzyme is an amount which results in the improved properties being obtained.

The improved properties are evaluated by comparison with dough and/or baked products prepared without addition of a deaminating oxidase in accordance with the present invention.

In a second aspect, the present invention relates to a method of preparing a dough and/or a baked product prepared from the dough comprising adding a deaminating oxidase enzyme, optionally present in a bread-improving or dough-improving composition, to the dough and/or to any ingredient of the dough and/or to any mixture of the dough ingredients.

In further aspects, the present invention relates to a dough and a baked product, respectively, produced by the present method as well as to a pre-mix comprising a deaminating oxidase enzyme. In the present context, the term "pre-mix" is intended to be understood in it's conventional meaning, i.e. as a mix of baking agents, normally including flour, which may be used not only in industrial bread-baking plants/facilities, but also in retail bakeries.

In a final aspect, the present invention relates to the use of a deaminating oxidase enzyme for the preparation of dough and/or baked products.

DETAILED DISCLOSURE OF THE INVENTION

As mentioned in the Background of the Invention section above deaminating oxidases have been found in a number of different organisms including animals, plants and microorganisms such as fungi (filamentous fungi or yeast) or bacteria. It is contemplated that the origin of the deaminating oxidase to be used in the present invention is not critical with a view to exerting its dough and/or baked product improving capability. Accordingly, the deaminating oxidase enzyme of the dough- and/or bread-improving composition of the invention may be of any of the above origins.

The deaminating enzyme to be used in the present invention may be an amine oxidase, i.e. an enzyme which is capable of catalyzing the oxidative deamination of amine containing substrates with the concomitant consumption of oxygen and water and the generation of hydrogen peroxide. It is presently believed that any type of amine oxidase may be used for the present purpose. The amine oxidase may be of mammalian or microbial origin, e.g. bacterial or fungal origin, and may be produced by recombinant DNA technology. The amine oxidase may e.g. be the one derived from any of the sources or of any of the types mentioned in Table 2 pp. 94–97 of the book "Oxidative Enzymes in Foods", Eds D. S. Robinson and N. A. M. Eskin, Elsevier Science Publishers Ltd, 1991 such as a methylamine oxidase, a monoamine oxidase, etc.

The amine oxidase may be a lysyl oxidase, i.e. an enzyme capable of oxidative deamination of lysyl.

The amine oxidase may be a benzylamine oxidase, e.g. of microbial origin, such as of fungal (filamentous fungal or yeast) origin. The benzylamine oxidase may be derived from the genus Pichia, such as *Pichia pastoris*, and may, e.g. be the enzyme described by Tur, S. S. and Lerch, K. in FEBS letters, vol. 238, No. 1, September 1988, pp. 74–76.

In a preferred embodiment the deaminating enzyme is a L-amino acid oxidase (E.C.1.4.3.2). The amino acid oxidase may show activity towards one or more amino acids, e.g. L-arginine, L-lysine, L-methionine, L-asparagine, L-phenylalanine, and L-leucine, L-serine, L-cysteine, L-glycine, L-glutamine, L-histidine, L-tryptophan, L-tyrosine, L-valine, L-threonine, L-proline, L-isoleucine, L-aspartate, L-glutamate, and L-alanine. Preferably, the L-amino oxidase shows activity towards one or more of the amino acids present in wheat, preferably free amino acids present in wheat.

The L-amino acid oxidase may, e.g., be derived from a plant or an animal (examples of such enzymes are given in table 2, pp. 94–97 of the book "Oxidative Enzymes in Foods" op. cit.) or may be derived from a microbial (fungal or bacterial) source. Examples of bacterial L-amino acid oxidases include the Corynebacterium L-amino acid oxidase described by Koyama H., Agric. Biol. Chem., 1988, 52(3), 743–78 and the *Cryptococcus laurentii* L-amino acid oxidase which is obtainable from the deposited strain DSM 2762. A suitable fungal L-amino acid oxidase may, e.g., be derived from a strain of Neurospora, e.g. *N. crassa* such as the enzyme described by Niedermann et al., J. Biol. Chem., 1990, 265(28), 17240–17251, or from a strain of Trichoderma, e.g. *T. harzianum* described in WO 94/25574.

The *T. harzianum* L-amino oxidase enzyme oxidizes a broad spectrum of amino acids, e.g. L-lysine, L-arginine, L-methionine, L-asparagine, L-phenylalanine, and L-leucine.

The deaminating oxidase may be obtained from the organism in question by use of any suitable technique. For instance, a deaminating oxidase preparation may be obtained by use of recombinant DNA techniques as known in the art. Such method normally comprises cultivation of a host cell transformed with a recombinant DNA vector capable of expressing and carrying a DNA sequence encoding the deaminating oxidase in question, in a culture medium under conditions permitting the expression of the enzyme and recovering the enzyme from the culture. The DNA sequence may be of genomic, cDNA or synthetic origin or any mixture of these, and may be isolated or synthesized in accordance with methods known in the art. The deaminating enzyme may also be extracted from the organism or relevant part thereof by which it is produced in nature.

The deaminating oxidase enzyme to be included in the bread-improving and/or dough-improving composition of the invention may be in any form suited for the use in question, e.g. in the form of a dry powder or granulate, in particular a non-dusting granulate, a liquid, in particular a stabilized liquid, or a protected enzyme. Granulates may be produced, e.g. as disclosed in U.S. Pat. Nos. 4,106,991 and 4,661,452 (both to Novo Industri A/S), and may optionally be coated by methods known in the art. Liquid enzyme preparations may, for instance, be stabilized by adding nutritionally acceptable stabilizers such as a sugar, a sugar alcohol or another polyol, lactic acid or another organic acid according to established methods. Protected enzymes may be prepared according to the method disclosed in EP 238, 216.

Normally, for inclusion in pre-mixes or flour it is advantageous that the deaminating oxidase enzyme preparation is in the form of a dry product, e.g. a non-dusting granulate, whereas for inclusion together with a liquid it is advantageously in a liquid form.

The bread- and/or dough-improving composition of the invention may further comprise one or more other enzymes. Examples of other enzymes are a cellulase, a hemicellulase, e.g., a pentosanase (useful for the partial hydrolysis of pentosans which increases the extensibility of the dough), a lipase (useful for the modification of lipids present in the dough or dough constituents so as to soften the dough), another oxidase, e.g. a glucose oxidase, a peroxidase (useful for improving the dough consistency), a protease (useful for gluten weakening, in particular when using hard wheat flour), a peptidase and/or an amylase, e.g., an α-amylase (useful for providing sugars fermentable by yeast). The other enzymes are preferably present in an effective amount to result in the desired properties of the dough and/or baked product be obtained.

The other enzyme components are preferably of microbial origin and may be obtained by conventional techniques used in the art as mentioned above.

The dough-improving and/or bread-improving composition may also comprise an added substrate for the deaminating enzyme in question. For instance, when the deaminating enzyme is an L-amino acid oxidase it may be advantageous that the dough-improving and/or bread-improving composition comprises an L-amino acid, e.g. any of the L-amino acids mentioned above, preferably selected in dependence of the substrate specificity of the L-amino oxidase to be used. The dosage of the substrate for the deaminating enzyme should be sufficient to allow for a sufficient reaction with the enzyme to generate the desired improved properties, such as improved gluten strengthening. Thus, when present, the substrate for the deaminating enzyme is present in an effective amount.

In addition or in an alternative to other enzyme components, the dough-improving and/or bread-improving composition may comprise a conventionally used baking agent, e.g. one or more of the following constituents:

A milk powder (providing crust colour), gluten (to improve the gas retention power of weak flours), an emulsifier (to improve dough extensibility and to some extent the consistency of the resulting bread), granulated fat (for dough softening and consistency of bread), an oxidant (added to strengthen the gluten structure; e.g. ascorbic acid, potassium bromate, potassium iodate or ammonium persulfate), an amino acid (e.g. cysteine), a sugar, and salt (e.g. sodium chloride, calcium acetate, sodium sulfate or calcium sulphate serving to make the dough firmer), flour or starch.

Examples of suitable emulsifiers are mono- or diglycerides, diacetyl tartaric acid esters of mono- or diglycerides, sugar esters of fatty acids, polyglycerol esters of fatty acids, lactic acid esters of monoglycerides, acetic acid esters of monoglycerides, polyoxyethylene stearates, phospholipids and lecithin.

The bread-improving and/or dough improving composition of the invention is typically included in the dough in an amount corresponding to 0.01–5%, in particular 0.1–3%.

In accordance with the method of the invention, in which a deaminating oxidase is used for the preparation of dough and/or baked products, the enzyme may be added as such to the mixture from which the dough is made. Alternatively, the deaminating oxidase enzyme may be added as a constituent of a dough-improving and/or a bread-improving composition as described above.

The dosage of the deaminating oxidase enzyme to be used in the method of the present invention should be adapted to the nature and composition of the dough in question, the extent of the desired improved properties to be obtained as well as to the nature of the deaminating oxidase enzyme to be used. Normally, the enzyme preparation is added in an amount corresponding to 0.01–1000 mg enzyme protein per kg of flour, preferably 0.1–100 mg enzyme protein per kg of flour, more preferably 0.1–10 mg enzyme protein per kg of flour. Accordingly, in the bread improving or dough improving composition of the invention an effective amount of the deaminating enzyme is included, which in most cases corresponds to a dosage of enzyme protein per kg of flour as indicated above.

In terms of enzyme activity, the appropriate dosage of a given deaminating oxidase enzyme for exerting a desirable improvement of dough and/or baked products will depend on the enzyme and the enzyme substrate in question. It will be within the knowledge of the skilled person to determine a suitable enzyme unity dosage. For instance, for the *Trichoderma harzianum* L-amino acid oxidase used in the following example, a suitable dosage range is 1–5000 Units/kg of flour, such as 10–2000 Units/kg of flour, more preferably 25–1000 Units/kg of flour, or 50–1000 Units/kg of flour.

When one or more additional enzyme activities are to be added in accordance with the method of the invention, these activities may be added separately or together with the deaminating oxidase preparation, optionally as constituent (s) of the bread-improving and/or dough-improving composition of the invention. The other enzyme activities may be any of the above described enzymes and may be dosed in accordance with established baking practice to result in the desired effect.

Analogously, when a substrate for the deaminating enzyme is to be added in accordance with the method of the invention, the substrate may be added separately or together with the deaminating oxidase preparation, optionally as constituent(s) of the bread-improving and/or dough-improving composition of the invention.

As mentioned above the deaminating oxidase enzyme is added to any mixture of dough ingredients, to the dough, or to any of the ingredients to be included in the dough, in other words the deaminating oxidase enzyme may be added in any step of the dough preparation and may be added in one, two or more steps, where appropriate.

The handling of the dough and/or baking is performed in any suitable manner for the dough and/or baked product in question, typically including the steps of kneading the dough, subjecting the dough to one or more proofing treatments, and baking the product under suitable conditions, i.e. at a suitable temperature and for a sufficient period of time. For instance, the dough may be prepared by using a normal straight dough process, a sour dough process, an overnight dough method, a low-temperature and long-time fermentation method, a frozen dough method, the Chorleywood Bread process, or the Sponge and Dough process.

The dough and/or baked product prepared by the method of is the invention are normally based on wheat meal or flour, optionally in combination with other types of meal or flour such as corn flour, rye meal, rye flour, oat flour or meal, soy flour, sorghum meal or flour, or potato meal or flour.

In the present context the term "baked product" is intended to include any product prepared from dough, either of a soft or a crisp character. Examples of baked products, whether of a white, light or dark type, which may advantageously be produced by the present invention are bread (in particular white, whole-meal or rye bread), typically in the form of loaves or rolls, French baguette-type bread, pita bread, tacos, cakes, pan-cakes, biscuits, crisp bread and the like.

The dough of the invention may be of any of the types discussed above, and may be fresh or frozen.

From the above disclosure it will be apparent that the dough of the invention is normally a leavened dough or a dough to be subjected to leavening. The dough may be leavened in various ways such as by adding sodium bicarbonate or the like or by adding a leaven (fermenting dough), but it is preferred to leaven the dough by adding a suitable yeast culture such as a culture of *Saccharomyces cerevisiae* (baker's yeast). Any of the commercially available *S. cereviciae* strains may be employed.

As mentioned above, the present invention further relates to a pre-mix, e.g., in the form of a flour composition, for dough and or baked products made from dough, which pre-mix comprises a deaminating oxidase enzyme. The pre-mix may be prepared by mixing a deaminating oxidase preparation or a bread-improving and/or dough-improving composition of the invention comprising a deaminating oxidase with a suitable carrier such as flour, starch, a sugar or a salt. The pre-mix may contain other dough-improving and/or bread-improving additives, e.g., any of the additives, including enzymes, mentioned above.

In a further aspect the invention relates to the use of a deaminating enzyme, in particular an effective amount of a deaminating enzyme, such as an amine oxidase or a L-amino acid oxidase, for improving properties of a dough and/or a baked product made therefrom. The type of deaminating oxidase as well as the manner in which it may be used is described in detail is above.

In a final aspect the invention relates to the use of a deaminating oxidase for the preparation of pasta dough, preferably prepared from durum flour or a flour of comparable quality. The dough may be prepared by use of conventional techniques and the deaminating oxidase used in a similar dosage as that described above. The deaminating oxidase may be any of the types described above and is preferably an amine oxidase or a L-amino acid oxidase. It is contemplated that when used in the preparation of pasta the deaminating oxidase results in a strengthening of the gluten structure and thus a reduction in the dough stickiness and an increased dough strength.

BRIEF DESCRIPTION OF DRAWINGS

The present invention is further illustrated by reference to the accompanying drawings, in which.

_(A): a dough with no added conditioner (=reference)

◊(B): a dough containing 120 ppm l-arginine.

∇(C): a dough containing 120 ppm l-arginine and 600 Units per kg of flour of an L-amino acid oxidase from *Trichoderma harzianum*.

Δ(D): a dough containing 60 Units per kg of flour of an L-amino acid oxidase from *Trichoderma harzianum*.

Figure 1:
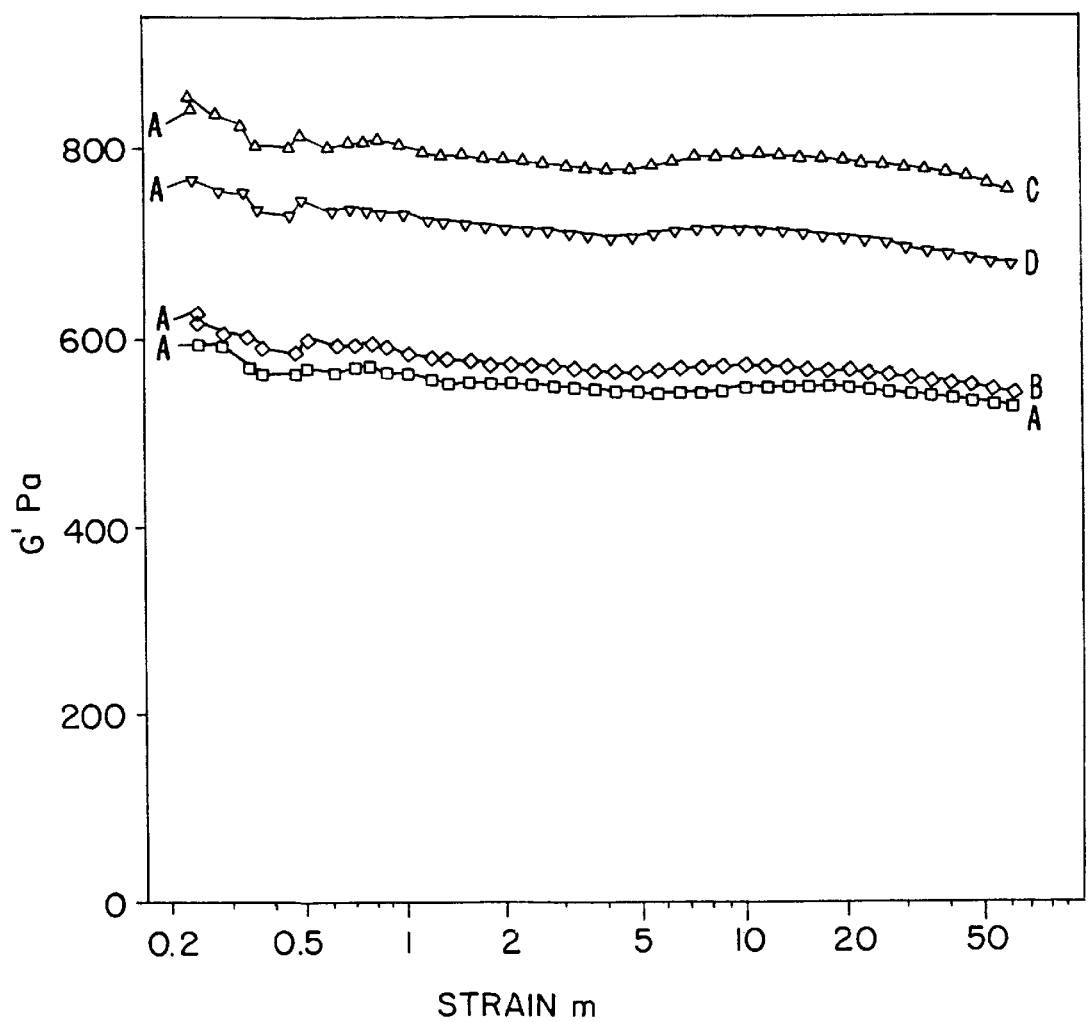
FIG. 1 shows the dynamic shear storage modulus G' in gluten from 4 different doughs characterized with the following symbols and letters.
Figure 2:
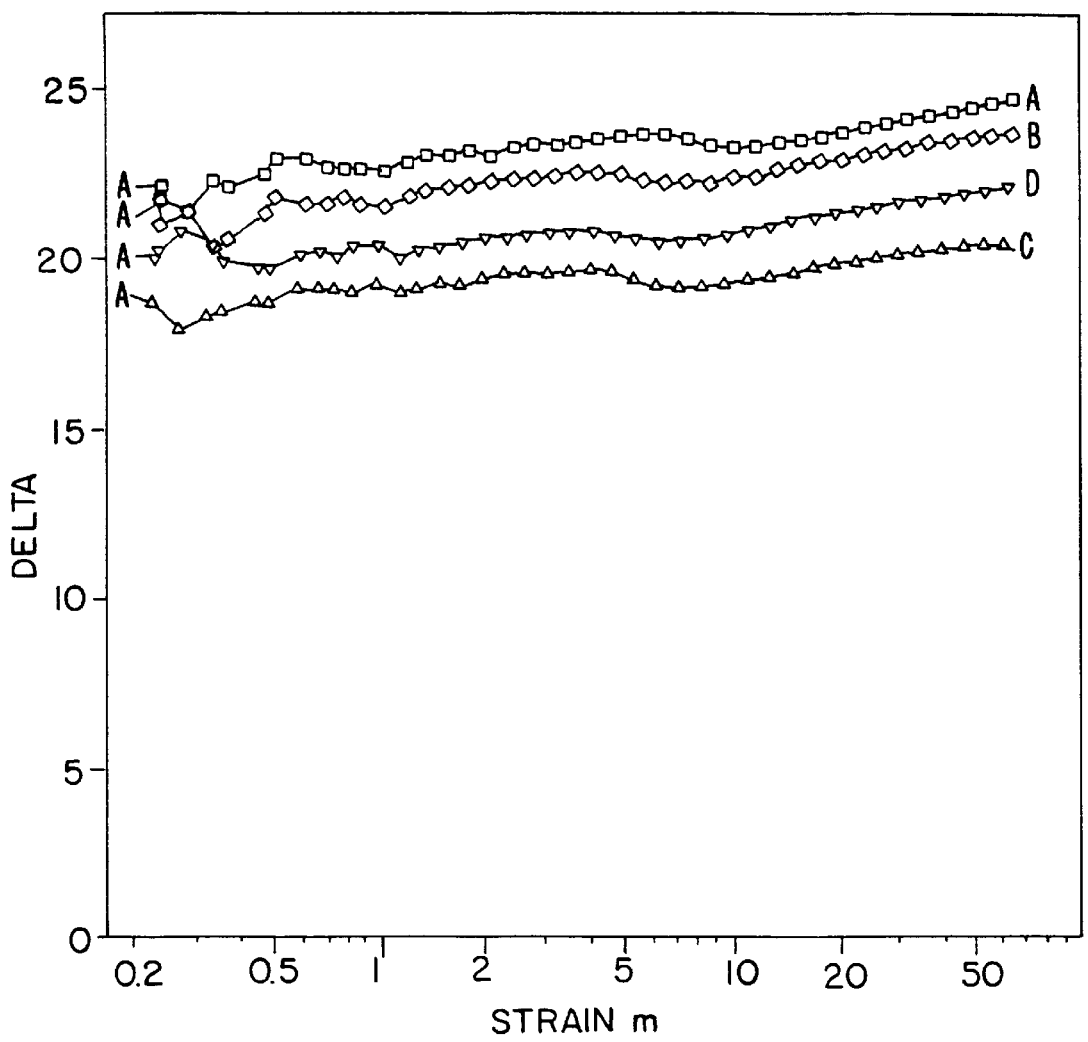

FIG. 2 shows the viscoelastic phase angle δ in gluten from 4 different doughs characterized with the same symbols and letters as in FIG. 1.

MATERIALS AND METHODS

Determination of L-amino Oxidase Activity

The enzyme is incubated with L-arginine in the presence of oxygen at pH 8.5 and at room temperature. The hydrogen peroxide thereby produced is determined by mixing with an excess of ABTS (2,2'-azinobis (3-ethylbenzothiazoline-6-sulfonate)) and peroxidase. The resulting blue-greenish colour after a total fixed reaction measured at 595 nm is a function of the concentration of hydrogen peroxide. The units are calculated from a hydrogen peroxide standard. One unit is the amount of enzyme which under standard conditions forms 1 µmole of hydrogen peroxide per minute.

Testing of Doughs and Breads

According to the present invention the effect of adding a deaminating oxidase may be tested in doughs and breads by using the following method:

Preparation of Breads

| Recipe: | |
|---|---|
| Water | 60% |
| Wheat Flour | 100% |
| Yeast | 4% |
| Salt | 1.5% |
| Sugar | 1.5% |

The wheat flour was of the type Meneba 964.

Procedure

1. Dough mixing (Spiral mixer)

3 min. at 700 RPM 3.3 min. at 1400 RPM the mixing time is determined and adjusted by a skilled baker so as to obtain an optimum dough consistence under the testing conditions used.

2. 1st proof: 30° C.-80% RH, 15 min.

3. Scaling and shaping;

4. Final proof: 32° C.-80% RH, 45 min. for rolls, 55 min. for loaves;

5. Baking: 230° C., 22 min. for rolls and 35 min for loaves.

Evaluation of Dough and Baked Products

Dough and baked products may be evaluated as follows:

Loaf specific volume: the mean value of 4 loaves' volume are measured using the traditional rape seed method. The specific volume is calculated as volume ml per g bread. The specific volume of the control (without enzyme) is defined as 100. The relative specific volume index is calculated as:

$$\text{Specific vol. index} = \frac{\text{specific vol. of 4 loaves}}{\text{spec. vol. of 4 control loaves}} \times 100$$

Rolls specific volume: is determined as the loaf specific volume the only difference being that 20 rolls are used instead of 4 loaves.

The dough stickiness and the crumb structure may be evaluated visually according to the following scale:

| Dough stickiness: | almost liquid | 1 |
|---|---|---|
| | too sticky | 2 |
| | sticky | 3 |
| | normal | 4 |
| | dry | 5 |
| Crumb structure: | very poor | 1 |
| | poor | 2 |
| | non-uniform | 3 |
| | uniform/good | 4 |
| | very good | 5 |

Dough extrability and Dough elasticity are determined manually by a skilled baker.

Bread firmness: The softness of bread crumb is measured by a SMS-Texture Analyzer. A plunger with a diameter of 20 mm is pressed on the middle of a 20 mm thick slice of bread, The force needed for the plunger to depress the crumb 5 mm with a speed of 2.0 mm/s is recorded and it is expressed as the crumb firmness. The lower the value, the softer is the crumb. Four slices of each bread are measured and the mean value is used.

Shock test: After the second proof a pan containing the dough is dropped from a height of 20 cm. The dough is baked and the volume of the resulting bread is determined.

EXAMPLE 1

L-amino Acid Oxidase from *T. harzianum* for Gluten Strengthening

The strengthening effect of a given dough conditioner on wheat flour dough or gluten dough may be measured by dynamic rheological measurements. These measurements are able to show the strength of a dough, under oscillation. Both wheat fluor dough and gluten dough are viscoelastic materials. In oscillatory measurements, the viscoelastic properties of a wheat dough and a gluten dough can be divided into two components, the dynamic shear storage modulus G' and the dynamic shear loss modulus G". The ratio of the loss and the storage moduli is numerically equal to the tangent of the viscoelastic phase angle δ. An increase in the storage modulus G' and a decrease in the phase angle δ indicate a stronger and more elastic dough.

The dynamic shear storage modulus G' and the viscoelastic phase angle δ were measured in the gluten from 4 doughs, which were treated with different conditioners in the amounts indicated in the legend to FIG. 1. The *T. harzianum* L-amino acid oxidase was obtained as described in WO 94/25574. The conditioners were added to the flour before dough mixing. The gluten was washed out of the flour dough containing the conditioner after the flour dough had been incubated at 32° C. for 1½ hours. The results of the tests are presented in FIGS. 1 and 2.

As shown in FIG. 1 it was surprisingly found that the storage modulus, G', is significantly higher when L-amino acid oxidase is present in the dough compared to controls without the enzyme. This effect is also seen when L-arginine is added to the doughs. This indicates that the gluten, and thereby also the dough, is significantly strengthened by the action of the enzyme.

In FIG. 2 it is shown that the viscoelastic phase angle, δ, is lowered relative to the controls when L-amino acid oxidase is present in the dough, indicating that a more elastic rheological property of the gluten and thereby the dough is achieved by the action of the enzyme.

EXAMPLE 2

Loaves and Rolls Baked with an L-amino Oxidase

Loaves and rolls were prepared as described in the Materials and Methods section above. The L-amino acid oxidase was that described in Example 1.

In addition to the standard recipe, L-arginine and ascorbic acid were added to the dough in the amounts specified in the table below.

The following results were obtained:

| Asc. Acid, ppm | 15 | 15 | 15 | 15 | 15 | 15 |
|---|---|---|---|---|---|---|
| L-arginine, ppm | 15 | 15 | 0 | 0 | 50 | 50 |
| L-AA oxidase, U/kg | 0 | 60 | 0 | 60 | 0 | 60 |
| Stickiness | 4 | 4.5 | 4 | 4.5 | 4 | 4.5 |
| Firmness | 4 | 4 | 4 | 4 | 4 | 3 |
| Extensibility | 3 | 2.5 | 3 | 2.5 | 3 | 2.5 |
| Elasticity | 3 | 2.5 | 3 | 2.5 | 3 | 2 |
| Rolls spec. Vol. | 100 | 114 | 102 | 109 | 102 | 111 |
| Loaf spec. Vol. | 100 | 111 | 100 | 114 | 99 | 112 |
| Shocked loaf | 100 | 106 | 99 | 103 | 97 | 104 |

The above results demonstrate effects of l-amino acid oxidase on dough handling, e.g. reduced stickiness, which is desirable, and a highly significant volume increase on rolls as well as loaves, whether shocked or non-shocked. Particularly, the improvement in shock stability, compared with the controls without enzyme added, is remarkable.

EXAMPLE 3

In this example the effect of using L-amino acid oxidase is compared with that of glucose oxidase. The L-amino acid oxidase was the one described in Example 1. The glucose oxidase used was Gluzyme available from Novo Nordisk A/S.

In addition to the standard recipe, L-arginine and ascorbic acid were added to the dough in the amounts specified in the table below.

The following results were obtained:

| Asc. Acid, ppm | 15 | 15 | 0 | 15 | 0 |
|---|---|---|---|---|---|
| L-arginine, ppm | 15 | 15 | 15 | 0 | 0 |
| L-AA oxidase, U/kg | 0 | 30 | 60 | 0 | 0 |
| Gluc. Oxidase U/kg | 0 | 0 | 0 | 150 | 150 |
| Loaf spec. Vol. | 100 | 111 | 102 | 106 | 89 |
| Shocked loaf | 100 | 108 | 91 | 100 | 80 |

From the above results it is apparent that the L-amino acid oxidase produces significantly better effects, than glucose oxidase, on the volume of non-schocked as well as schocked bread. Also, when no ascorbic acid is added the effect of the l-amino acid oxidase is better than that obtainable with glucose oxidase.

We claim:

1. A method for preparing a dough or a baked product produced from the dough, comprising adding to dough or dough ingredients an L-amino acid oxidase or a benzylamine oxidase in an amount effective to improve gluten strength, stickiness, or rheological properties of dough, or specific volume of the baked product.

2. The method of claim 1, wherein an L-amino acid oxidase is added to the dough or dough ingredients.

3. The method of claim 2, wherein the L-amino acid oxidase is added in an amount corresponding to 0.01–1000 mg enzyme protein per kg of flour.

4. The method of claim 3, further comprising adding a second enzyme to the dough or dough ingredients, wherein the second enzyme is an enzyme other than an L-amino acid oxidase.

5. The method of claim 4, wherein the second enzyme is a cellulase, a hemicellulase, a pentosanase, a lipase, a peroxidase, a protease, a peptidase, an amylase, and/or an oxidase other than an L-amino acid oxidase.

6. The method of claim 5, wherein the hemicellulase is pentosanase.

7. The method of claim 1, wherein one or more of an L-amino acid or oxidant is added to the dough or dough ingredients.

8. The method of claim 7, wherein the oxidant one of ascorbic acid, potassium bromate, potassium iodate and ammonium persulfate.

9. The method of claim 2, wherein the L-amino acid oxidase is obtainable from a strain of Neurospora or Trichoderma.

10. The method of claim 9, wherein the L-amino acid oxidase is obtainable from *Trichoderma harzianum*.

11. The method of claim 1, wherein a benzyl amine oxidase is added to the dough or dough ingredients.

12. The method of claim 11, wherein the benzyl amine oxidase is obtainable from a strain of Pichia.

13. The method of claim 12, wherein the benzyl amine oxidase is obtainable from a strain of *Pichia pastoris*.

14. A dough or baked product prepared from a dough prepared by the method of claim 1.

15. A bread- or dough-improving composition comprising
   (i) an L-amino acid oxidase or a benzylamine oxidase, and
   (ii) milk powder, gluten, an emulsifier, granulated fat, ascorbic acid, potassium bromate, potassium iodate, ammunium persulfate, cysteine, a sugar, flour, starch, a cellulase, a hemicellulase, a pentosanase, a lipase, a peroxidase, a protease, a peptidase, an amylase, and/or an oxidase other than an L-amino acid oxidase.

16. The bread- or dough-improving composition of claim 15, wherein the emulsifier is a mono- or diglyceride, a diacetyl tartaric ester of a mono- or diglyceride, a sugar ester of a fatty acid, a polyglycerol ester of a fatty acid, a lactic acid ester of a monoglyceride, an acetic acid ester or a monoglyceride, a polyoxyethylene stearate, a phospholipid, or lecithin.

17. The composition of claim 15 in the form of a dry powder or granulate.

* * * * *